United States Patent
Mayer et al.

(10) Patent No.: US 6,649,688 B1
(45) Date of Patent: Nov. 18, 2003

(54) COATING COMPOSITION COMPRISING AT LEAST THREE COMPONENTS, IT PREPARATION AND USE

(75) Inventors: Bernd Mayer, Münster (DE); Heinz-Peter Rink, Münster (DE); Egbert Nienhaus, Ascheberg (DE); Wilma Löcken, Haltern (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/856,950

(22) PCT Filed: Oct. 23, 1999

(86) PCT No.: PCT/EP99/08048

§ 371 (c)(1),
(2), (4) Date: Jun. 22, 2001

(87) PCT Pub. No.: WO00/32665

PCT Pub. Date: Jun. 8, 2000

(30) Foreign Application Priority Data

Nov. 30, 1998 (DE) .......................... 198 55 125

(51) Int. Cl.$^7$ ................................. C08F 16/04
(52) U.S. Cl. ...................... 524/558; 524/560; 524/563; 524/562; 524/564; 524/590; 525/185; 525/186; 525/190; 525/326.3
(58) Field of Search ................. 524/591, 839, 524/502, 506, 507, 589, 558, 560, 563, 562, 564, 590; 525/127, 140, 49, 185, 186, 190, 326.3; 252/182.2, 182.21, 182.22; 523/409

(56) References Cited

U.S. PATENT DOCUMENTS

| 5,202,377 A | * | 4/1993 | Thorne et al. ............... 524/591 |
| 6,025,031 A | | 2/2000 | Lettmann et al. ........ 427/388.4 |
| 6,309,707 B1 | | 10/2001 | Mayer et al. ................ 427/386 |

FOREIGN PATENT DOCUMENTS

| DE | 4421823 | 1/1996 | ......... C09D/175/04 |
| DE | 19542626 | 4/1997 | ......... C09D/175/04 |
| DE | 19618446 | 11/1997 | ......... C09D/175/04 |
| EP | 516277 | 12/1992 | ........... C08G/18/10 |
| GB | 2237812 | 5/1991 | ............ C09D/5/08 |

OTHER PUBLICATIONS

Encyclopedia of Polymer Science and Engineering, 1986, A wiley–Interscience Publication, vol. 6, p. 225.*
USPTO translated copy of DE 4421823 to Mayer et al., Germany, Publication Date: Jan. 1996.*
U.S. Ser. No. 09/051,892 filed on Apr. 1, 1999.

* cited by examiner

*Primary Examiner*—David W. Wu
*Assistant Examiner*—Satya Sastri

(57) ABSTRACT

A coating composition consisting of at least three components, comprising a component (I) comprising at least one hydroxyl-containing oligomeric or polymeric resin dispersed or dissolved in one or more organic, optionally water dilutable solvents, as binder (A), a component (II) comprising at least one polyisocyanate dispersed or dissolved in one or more organic, optionally water dilutable solvents, as crosslinking agent (F), and a component (III) which comprises water, wherein component (I) comprises at least one hydroxyl-containing polyacrylate resin (A) containing polyether sidegroups and/or endgroups of the general formula I $$Y-(-O-R-)_n- \qquad (I)$$

in which the index and variables have the following meanings:

$n=3$ to 100;
$R=C_2$ to $C_6$ alkanediyl and $C_3$ to $C_8$ cycloalkanediyl;
$Y=$hydrogen atom or $C_1$ to $C_4$ alkyl;
as binder (A).

14 Claims, No Drawings

COATING COMPOSITION COMPRISING AT LEAST THREE COMPONENTS, IT PREPARATION AND USE

The present invention relates to a coating composition consisting of at least three components (3K system) comprising a component (I) comprising at least one hydroxyl-containing oligomeric or polymeric resin dispersed or dissolved in one or more organic, optionally water dilutable solvents, as binder (A), a component (II) comprising at least one polyisocyanate dispersed or dissolved in one or more organic, optionally water dilutable solvents, as crosslinking agent (F), and a component (III) which comprises water. The present invention additionally relates to a process for preparing these coating compositions and also to the use of the coating compositions in automotive OEM finishing, refinish, and for the coating of plastics, and also as topcoat materials or primer-surfacers.

Coating compositions or 3K systems of the abovementioned type where binders (A) contain acid groups as well as the hydroxyl groups are known from the German patents DE-A-195 42 626 and DE-A-44 21 823. These known coating compositions already have comparatively few surface problems, such as popping marks or structuring, and as regards gloss, relaxation, spraying reliability, fullness, weathering stability, and other important technological properties they possess a good profile of properties. It is recommended therein that use be made of (meth)acrylic oxaalkyl esters or oxacycloalkyl esters such as ethyl triglycol (meth) acrylate and methoxyoligoglycol (meth)acrylate having a molecular weight Mn of preferably 550, or other ethoxylated and/or propoxylated, hydroxyl-free (meth)acrylic acid derivatives, for the preparation of the polyacrylate resins used as binders (A). However, these polyacrylate resins (A) are used in 3K systems which give high gloss coatings.

The increasingly more stringent requirements of the market are making it necessary to improve these known coating compositions still further in terms of their homogeneity, stability, handling, and popping limits. Moreover, the solvent content is to be lowered further than has been possible to date. Furthermore, even on forced drying, the known 3K systems should give coatings which have no surface defects. They should have an even higher gasoline resistance and an even lower gray haze than the known 3K systems.

Furthermore, it is desirable or necessary in some cases to use matt coatings rather than highly glossy coatings. However, the 3K systems known to date have always been optimized with respect to the high gloss of the coatings produced using them.

It is an object of the present invention to provide a new 3K system which is easy to prepare, homogeneous, stable, easy to handle, low in solvent, resistant to popping, reliable in its spraying properties, and stable on forced drying and which gives matt coatings which do not have surface defects or gray haze but which instead are stable to weathering and resistant to gasoline.

The invention accordingly provides the novel coating composition consisting of at least three components, comprising (I) a component comprising at least one hydroxyl-containing oligomeric or polymeric resin dispersed or dissolved in one or more organic, optionally water dilutable solvents, as binder (A), (II) a component comprising at least one polyisocyanate dispersed or dissolved in one or more organic, optionally water dilutable solvents, as crosslinking agent (F), and (III) a component which comprises water, wherein component (I) or components (I) and (II) comprise or comprises at least one hydroxyl-containing polyacrylate resin (A) containing polyether sidegroups and/or endgroups of the general formula I

in which the index and variables have the following meanings:

n=3 to 100;

R=$C_2$ to $C_6$ alkanediyl and $C_3$ to $C_8$ cycloalkanediyl;

Y=hydrogen atom or $C_1$ to $C_4$ alkyl; as binder (A).

In the text below, the polyacrylate resins (A) for use in accordance with the invention containing polyether sidegroups and/or endgroups are referred to for the sake of brevity as "constituents important to the invention".

In the text below the novel coating composition consisting of at least three components is referred to for the sake of brevity as the "coating composition of the invention".

The present invention further provides a process for preparing the coating compositions of the invention, and also provides for their use in refinish, for the coating of plastics, and also as topcoat materials or primer-surfacers.

In the light of the prior art it was unforeseeable that the solution of the problem, with all of its advantages, might be achieved by means of the polyacrylate resins (A) containing polyether sidegroups and/or endgroups. This was all the more surprising in view of the fact that the prior art polyacrylate resins containing hydroxyl and acid groups, which are close relations chemically, are used in 3K systems which give high gloss coatings.

The coating compositions of the invention are notable, surprisingly, for a profile of properties which is improved over the prior art in relation in particular to the homogeneity, fullness, lower popping tendency, spraying reliability, leveling, and insensitivity to forced drying, and also in respect of the weathering stability and very good adhesion of the resultant coatings of the invention.

It is surprising, furthermore, that the coating compositions of the invention comprising said at least three components may be prepared simply by mixing without the need for complicated mixing and/or dispersing apparatus as described, for example, in the German patent DE-A-195 10 651. The coating compositions of the invention are therefore especially suitable for the field of automotive refinish, since they can be prepared by the painter by simple mixing of the components directly prior to their application and can be cured at low temperatures.

A further advantage is that the coating compositions of the invention prepared from said at least three components contain only a small fraction of volatile organic solvents, despite the fact that the coating compositions are prepared using crosslinkers and binders dispersed and/or dissolved in organic media.

Moreover, the coating compositions of the invention ensure a high level of variability, since it is possible to use not only the crosslinking agents, pigments and additives that are recommended for aqueous coating compositions but also those used in conventional systems.

Finally, a feature of the inventive components of the coating compositions of the invention is a very good storage stability, which corresponds to that of conventional coating compositions.

The constituent of the coating compositions of the invention that is important to the invention is present in component (I) or in components (I) and (III), but especially in component (I). It inventively comprises at least one polyacrylate resin (A) containing polyether sidegroups and/or endgroups. In component (I) or components (I) and (III) for use in accordance with the invention, it is present in an amount, based on the components, of from 20 to 90, preferably from 30 to 80, with particular preference from 40 to 75, and in particular from 45 to 70% by weight.

As the constituent important to the invention, suitable compounds include preferably all oligomeric or polymeric acrylate copolymers having a number average molecular weight Mn of between 1 000 and 50 000 daltons and an OH number of from 40 to 300 mg KOH/g. If the mixing of components (I), (II) and (III) is to take place by manual stirring, it is of advantage for the coating composition of the invention if the constituents of the invention are selected such that their 50% strength solution in ethoxyethyl propionate at 23° C. has a viscosity of ≦10 dpas. Where mechanical mixing is to take place, it is possible to use constituents of the invention that are of high viscosity, whose 50% strength solution in ethoxyethyl propionate at 23° C. has a viscosity of ≦100 dpas. The upper limit on the viscosity is imposed merely by the performance of the mixing units.

The constituent important to the invention contains polyether sidegroups and/or endgroups. Although these groups may be introduced into the constituent of the invention in any way, for example, by polymer-analogous reactions of suitable polyacrylate resins with compounds containing these groups, it is nevertheless of advantage in accordance with the invention to prepare the constituent important to the invention by means of copolymerization of (meth)acrylates containing polyether groups and other monomers copolymerizable therewith.

The polyether groups for use in accordance with the invention that are present in the constituents of the invention have the general formula I

$$Y\text{—}(\text{—}O\text{—}R\text{—})_n\text{—} \qquad (I)$$

in which the index and variables have the following meanings:

n=3 to 100, preferably 5 to 7, with particular preference 10 to 50, and in particular 15 to 30;

R=$C_2$ to $C_6$ alkanediyl and $C_3$ to $C_8$ cycloalkanediyl, especially methylene, ethylene, propylene, tetramethylene, pentamethylene or hexamethylene or cyclopropanediyl, cyclobutanediyl, cyclopentanediyl, cyclohexanediyl, cycloheptanediyl or cyclooctanediyl;

Y=hydrogen atom or $C_1$ to $C_4$ alkyl, especially methyl, ethyl, n-propyl or n-butyl.

Especially suitable polyether groups have a number average molecular weight Mn of from 133 to 1 500, preferably from 200 to 1 000, with particular preference from 250 to 900, and in particular from 300 to 800 daltons.

Examples of especially suitable (meth)acrylates for use in accordance with the invention, containing polyether groups, are accordingly polyethylene glycol monomethacrylates or monoacrylates or methoxypolyethylene glycol methacrylates or acrylates, especially those in which the polyether groups have a number average molecular weight Mn of from 700 to 800, especially 750.

For the preparation of the constituent of the invention, the (meth)acrylates containing polyether groups are copolymerized with suitable further monomers. Examples of suitable comonomers are the monomers (a1) described below in connection with the preparation of the polyacrylate resins (A1) containing hydroxyl and acid groups, with the exception of the (meth)acrylates specified there that contain polyether groups, and (a2) and also, where appropriate, (a4), (a5) and/or (a6).

Particularly advantageous constituents important to the invention contain from 5 to 45, preferably from 10 to 40, with particular preference from 15 to 30, and in particular from 15 to 25% by weight of at least one (meth)acrylate containing polyether groups, from 15 to 50, preferably from 20 to 45, with particular preference from 25 to 40, and in particular from 25 to 35% by weight of at least one of the monomers (a1) described below, from 10 to 60, preferably from 15 to 50, with particular preference from 20 to 45, and in particular from 25 to 35% by weight of at least one of the monomers (a2) described below, and from 0 to 40% by weight, preferably from 1 to 35, with particular preference from 3 to 30, and in particular from 5 to 25% by weight of at least one of the monomers (a4), (a5) and/or (a6) described below, but especially vinylaromatics (a6)

in copolymerized form, the fractions adding up to 100% by weight.

Viewed in terms of its method, the preparation of the constituent of the invention has no special features but instead takes place in accordance with the methods described below in the context of the preparation of the polyacrylate resins (A1) containing hydroxyl and acid groups.

Component (I) for use in accordance with the invention may comprise the constituent important to the invention as sole binder (A). It is, however, also possible for other suitable hydroxyl-containing binders (A), especially binders (A) containing hydroxyl and acid groups, to be present in the component. Such binders preferably comprise oligomeric or polymeric resins (A) which contain hydroxyl and acid groups and are dispersible or soluble in one or more organic, optionally water dilutable solvents.

Examples of suitable polymeric or oligomeric resins (A) of this kind are

A1) acrylate copolymers (A1) which are dispersed or dissolved in one or more organic, optionally water dilutable solvents, contain hydroxyl groups and acid groups which can be converted into the corresponding acid anion groups, and have a number average molecular weight Mn of between 1 000 and 30 000 daltons, an OH number of from 40 to 200 mg KOH/g, and an acid number of from 5 to 150 mg KOH/g, (A2) polyester resins (A2) which are dispersed or dissolved in one or more organic, optionally water dilutable solvents, contain hydroxyl groups and acid groups which can be converted into the corresponding acid anion groups, and have a number average molecular weight Mn of between 1 000 and 30 000 daltons, an OH number of from 30 to 250 mg KOH/g, and an acid number of from 5 to 150 mg KOH/g, and/or (A3) polyurethane resins (A3) which are dispersed or dissolved in one or more organic, optionally water dilutable solvents, contain hydroxyl groups and acid groups which can be converted into the corresponding acid anion groups, and have a number average molecular weight Mn of between 1 000 and 30 000 daltons, an OH number of from 20 to 200 mg KOH/g, and an acid number of from 5 to 150 mg KOH/g, and also (A4) if desired, a further binder.

If the mixing of the components (I), (II) and (III) is to take place by manual stirring, it is of advantage for the coating composition of the invention if the binders (A), especially the binders (A1), (A2) and/or (A3) and (A4), are selected such that their 50% strength solution of the binder (A) in ethoxyethyl propionate at 23° C. has a viscosity of ≦10 dpas. Where mechanical mixing is to take place, it is possible to use binders (A) of higher viscosity, whose 50% strength solution in ethoxyethyl propionate at 23° C. has a viscosity of ≧100 dpas. The viscosity is limited at the top end only by the performance capacity of the mixing equipment.

Suitable acrylate copolymers (A1) containing hydroxyl groups and acid groups include all acrylate copolymers having the stated OH numbers, acid numbers, molecular weights, and viscosities.

With particular preference, use is made as component (A1) of acrylate copolymers obtainable by polymerizing a1) a (meth)acrylic ester which is substantially free from acid groups and is different from but copolymerizable with (a2), (a3), (a4), (a5), and (a6); or a mixture of such monomers, a2) an ethylenically unsaturated monomer which carries at least one hydroxyl group per molecule and is substantially free from acid groups, and which is copolymerizable with (a1), (a3), (a4), (a5), and (a6) but different from (a5); or a mixture of such monomers, a3) an ethylenically unsaturated monomer which carries per molecule at least one acid group which can be converted into the corresponding acid anion group, and which is copolymerizable with (a1), (a2), (a4), (a5), and (a6); or a mixture of such monomers, and a4) if desired, one or more vinyl esters of alpha-branched monocarboxylic acids having from 5 to 18 carbon atoms per molecule, and/or a5) if desired, at least one reaction product of acrylic acid and/or methacrylic acid with the glycidyl ester of an alpha-branched monocarboxylic acid having from 5 to 18 carbon atoms per molecule, or instead of the reaction product an equivalent amount of acrylic and/or methacrylic acid which is then reacted during or after the polymerization reaction with the glycidyl ester of an alpha-branched monocarboxylic acid having from 5 to 18 carbon atoms per molecule, a6) if desired, an ethylenically unsaturated monomer which is substantially free from acid groups, is copolymerizable with (a1), (a2), (a3), (a4), and (a5) but different from (a1), (a2), (a4), and (a5); or a mixture of such monomers, in an organic solvent or solvent mixture and in the presence of at least one polymerization initiator, the nature and amount of (a1), (a2), (a3), (a4), (a5), and (a6) being selected so that the polyacrylate resin (A1) has the desired OH number, acid number, and molecular weight.

To prepare the polyacrylate resins (A1) it is possible as component (a1) to use any (meth)acrylic alkyl or cycloalkyl ester which is copolymerizable with (a2), (a3), (a4), (a5), and (a6) and which has up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-lH-indenemethanol or tert-butyl-cyclohexyl (meth)acrylate; (meth)acrylic oxaalkyl esters or oxacycloalkyl esters such as ethyl triglycol (meth)acrylate and methoxyoligoglycol (meth)acrylate having a molecular weight Mn of preferably 550; or other ethoxylated and/or propoxylated, hydroxyl-free (meth)acrylic acid derivatives. These may contain minor amounts of (meth)acrylic alkyl or cycloalkyl esters of higher functionality, such as ethylene glycol, propylene glycol, diethylene glycol, dipropylene glycol, butylene glycol, 1,5-pentanediol, 1,6-hexanediol, octahydro-4,7-methano-1H-indene-dimethanol or 1,2-, 1,3- or 1,4-cyclohexanediol di(meth)acrylate; trimethylolpropane di- or tri(meth)acrylate; or pentaerythritol di(meth) acrylate, tri(meth)acrylate or tetra(meth)acrylate. In the context of the present invention, minor amounts of monomers of relatively high functionality are understood as being amounts which do not lead to crosslinking or gelling of the polyacrylate resins.

As component (a2) it is possible to use ethylenically unsaturated monomers which carry at least one hydroxyl group per molecule and are substantially free from acid groups, and are copolymerizable with (a1), (a3), (a4), (a5), and (a6) but different from (a5), such as hydroxyalkyl esters of acrylic acid, methacrylic acid or another alpha,beta-ethylenically unsaturated carboxylic acid which are derived from an alkylene glycol which is esterified with the acid or are obtainable by reacting the acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl, octahydro-4,7-methano-1H-indenedimethanol or methylpropanediol monoacrylate, monomethacrylate, monoethacrylate, monocrotonate, monomaleate, monofumarate or monoitaconate; or reaction products of these hydroxyalkyl esters and cyclic esters, such as epsilon-caprolactone, for example; or olefinically unsaturated alcohols such as allyl alcohol or polyols such as trimethylolpropane monoallyl or diallyl ether or pentaerythritol monoallyl, diallyl or triallyl ether. Regarding these monomers (a2) of higher functionality, the comments made regarding the higher-functional monomers (a1) apply analogously. The fraction of trimethylolpropane monoallyl ether is usually from 2 to 10% by weight, based on the overall weight of the monomers (a1) to (a6) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylol-propane monoallyl ether in particular, may be used as sole hydroxyl-containing monomers, but in particular may also be used proportionally in combination with other of the hydroxyl-containing monomers mentioned.

As component (a3), it is possible to use any ethylenically unsaturated monomer which carries at least one acid group, preferably a carboxyl group, per molecule and is copolymerizable with (a1), (a2), (a4), (a5), and (a6); or a mixture of such monomers. Acrylic acid and/or methacrylic acid are used with particular preference as component (a3). It is, however, also possible to use other ethylenically unsaturated carboxylic acids having up to 6 carbon atoms in the molecule. Examples of such acids are ethacrylic acid, crotonic acid, maleic acid, fumaric acid, and itaconic acid. A further possibility is to use ethylenically unsaturated sulfonic or phosphonic acids, and/or their partial esters, as component (a3). Further suitable components (a3) include mono(meth) acryloyloxyethyl maleate, succinate, and phthalate.

As component (a4), use is made of one or more vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may contain both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters may be prepared conventionally from the acids, by reacting the acid with acetylene, for example. Particular preference is given—owing to their ready availability—to using vinyl esters of saturated aliphatic monocarboxylic acids having 9 to 11 carbon atoms that are branched on the alpha carbon atom.

As component (a5), the reaction product of acrylic acid and/or methacrylic acid with the glycidyl ester of an alpha-branched monocarboxylic acid having from 5 to 18 carbon atoms per molecule is used. Glycidyl esters of highly branched monocarboxylic acids are available under the trade name Cardura. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic acid. This glycidyl ester is available commercially under the name Cardura E10.

As component (a6) it is possible to use all ethylenically unsaturated monomers that are substantially free from acid groups and are copolymerizable with (a1), (a2), (a3), (a4), and (a5) but different from (a1), (a2), (a3), and (a4); or mixtures of such monomers. Suitable components (a6) include olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl-methyl-(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene, and/or vinyltoluene;

nitrites such as acrylonitrile and/or methacrylo-nitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or polysiloxane macromonomers which have a number average molecular weight Mn of from 1 000 to 40 000, preferably from 2 000 to 20 000, with particular preference from 2 500 to 10 000, and in particular from 3 000 to 7 000, and contain on average from 0.5 to 2.5, preferably from 0.5 to 1.5, ethylenically unsaturated double bonds per molecule, as described in DE-A 38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823, or in the international patent application WO 92/22615 on page 12, line 18 to page 18, line 10, or acryloxysilane-containing vinyl monomers, preparable by reacting hydroxy-functional silanes with epichlorohydrin and then reacting that reaction product with methacrylic acid and/or hydroxyalkyl esters of (meth)acrylic acid.

It is preferred to use vinylaromatic hydrocarbons.

It is of advantage to use the polysiloxane macromonomers (a6) together with other monomers (a6). In this case the amount of the polysiloxane macromonomer or macromonomers (a6) for modifying the acrylate copolymers (A1) should be less than 5% by weight, preferably from 0.05 to 2.5% by weight, with particular preference from 0.05 to 0.8% by weight, based in each case on the overall weight of the monomers used to prepare the copolymer (A1). The use of such polysiloxane macromonomers leads to an improvement in the slip of the coatings of the invention.

The nature and amount of components (a1) to (a6) is selected such that the polyacrylate resin (A1) has the desired OH number, acid number, and glass transition temperature. Acrylate resins (A1) used with particular preference are obtained by polymerizing (a1) from 20 to 60% by weight, preferably from 30 to 50% by weight, of component (a1), (a2) from 10 to 40% by weight, preferably from 15 to 35% by weight, of component (a2), (a3) from 1 to 15% by weight, preferably from 2 to 8% by weight, of component (a3), (a4) from 0 to 25% by weight, preferably from 5 to 15% by weight, of component (a4), (a5) from 0 to 25% by weight, preferably from 5 to 15% by weight, of component (a5), and (a6) from 5 to 30% by weight, preferably from 10 to 20% by weight, of component (a6), the sum of the weight fractions of components (a1) to (a6) being in each case 100% by weight.

The polyacrylate resins (A1) are prepared in an organic solvent or solvent mixture and in the presence of at least one polymerization initiator. Organic solvents and polymerization initiators used are the solvents and polymerization initiators which are customary for the preparation of polyacrylate resins and suitable for the preparation of aqueous dispersions. The solvents may participate in the reaction with the crosslinking component (II) and may therefore act as thermally crosslinkable reactive diluents.

Examples of suitable thermally crosslinkable reactive diluents are branched, cylic and/or acyclic $C_9$–$C_{16}$ alkanes functionalized with at least two hydroxyl groups, preferably dialkyloctanediols, especially the positionally isomeric diethyloctanediols.

Further examples of suitable thermally crosslinkable reactive diluents are oligomeric polyols obtainable by hydroformylation and subsequent hydrogenation of oligomeric intermediates themselves obtained by metathesis reactions of acyclic monoolefins and cyclic monoolefins; examples of suitable cyclic monoolefins are cyclobutene, cyclopentene, cyclohexene, cyclooctene, cycloheptene, norbornene, and 7-oxa-norbornene; examples of suitable acyclic monoolefins are contained in hydrocarbon mixtures obtained in petroleum processing by cracking ($C_5$ cut); examples of suitable oligomeric polyols for use in accordance with the invention have a hydroxyl number (OHN) of from 200 to 450, a number average molecular weight Mn of from 400 to 1 000, and a mass average molecular weight Mw of from 600 to 1 100.

Further examples of suitable thermally crosslinkable reactive diluents are hyperbranched compounds having a tetrafunctional central group, derived from ditrimethylolpropane, diglycerol, ditrimethylolethane, pentaerythritol, tetrakis(2-hydroxyethyl)methane, tetrakis (3-hydroxypropyl)methane or 2,2-bishydroxy-methyl-1,4-butanediol (homopentaerythritol). These reactive diluents may be prepared by the customary and known methods of preparing hyperbranched and dendrimeric compounds. Suitable synthesis methods are described, for example, in the patents WO 93/17060 and WO 96/12754 or in the book by G. R. Newkome, C. N. Moorefield and F. Vögtle, "Dendritic Molecules, Concepts, Syntheses, Perspectives", VCH, Weinheim, New York, 1996.

Further examples of suitable reactive diluents are polycarbonatediols, polyesterpolyols, poly(meth)-acrylatediols or hydroxyl-containing polyaddition products.

Examples of suitable isocyanate-reactive solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate or 3-methyl-3-methoxybutanol and also derivatives based on propylene glycol, e.g., ethoxyethyl propionate, iso-propoxypropanol or methoxypropyl acetate.

It is also possible in this context first to prepare the polyacrylate resins (A1) in a solvent which is not water dilutable and following the polymerization to replace some or all of this solvent by water dilutable solvent.

Examples of suitable polymerization initiators are initiators which form free radicals, such as tert-butyl peroxyethylhexanoate, benzoyl peroxide, azobisisobutyronitrile, and tert-butyl perbenzoate, for example. The initiators are used preferably in an amount from 2 to 25% by weight, with particular preference from 4 to 10% by weight, based on the overall weight of the monomers.

The polymerization is appropriately conducted at a temperature from 80 to 200° C., preferably from 110 to 180° C. Preferred solvents used are ethoxyethyl propionate and isopropoxypropanol.

The polyacrylate resin (A1) is preferably prepared by a two-stage process, since in that way the resultant coating compositions of the invention possess better processing properties. It is therefore preferred to use polyacrylate resins which are obtainable by 1. polymerizing a mixture of (a1), (a2), (a4), (a5), and (a6), or a mixture of portions of components (a1), (a2), (a4), (a5), and (a6), in an organic solvent,
2. after at least 60% by weight of the mixture consisting of (a1), (a2), (a4), (a5), and, where used, (a6) have been added, adding (a3) and any remainder of components (a1), (a2), (a4), (a5), and (a6), and continuing polymerization, and
3. after the end of the polmerization, subjecting the resulting polyacrylate resin if desired to at least partial neutralization, i.e., converting the acid groups into the corresponding acid anion groups.

In addition, however, it is also possible to include components (a4) and/or (a5) in the initial charge together with at least part of the solvent, and to meter in the remaining components. Moreover, it is also possible for components (a4) and/or (a5) to be included only in part in the initial charge, together with at least part of the solvent, and for the remainder of these components to be added as described above.

Preferably, for example, at least 20% by weight of the solvent and about 10% by weight of component (a4) and (a5), and also, if desired, portions of components (a1) and (a6), are included in the initial charge.

Preference is also given to preparing the polyacrylate resins (A1) by means of a two-stage process in which stage (I) lasts from 1 to 8 hours, preferably from 1.5 to 4 hours, and a mixture of (a3) and any remainder of components (a1), (a2), (a4), (a5), and (a6) is added over the course of from 20 to 120 minutes, preferably over the course of from 30 to 90 minutes. Following the end of the addition of the mixture consisting of (a3) and any remainder of components (a1), (a2), (a4), (a5), and (a6), polymerization is continued until all of the monomers used have undergone substantially complete reaction.

The amount and rate of addition of the initiator are preferably chosen so as to give a polyacrylate resin (A1) having a number average molecular weight Mn of from 1000 to 30000 daltons. It is preferred to commence the initiator feed a certain time, generally about 15 minutes, before the feeding of the monomers. Preference is given, further, to a process in which the addition of initiator is commenced at the same point in time as the addition of the monomers and is ended about half an hour after the addition of the monomers has ended. The initiator is preferably added in a constant amount per unit time. Following the end of the addition of initiator, the reaction mixture is held at polymerization temperature until (generally 1.5 hours) all of the monomers used have undergone substantially complete reaction. "Substantially complete reaction" is intended to denote that preferably 100% by weight of the monomers used have undergone reaction but that it is also possible for a small residual monomer content of not more than up to about 0.5% by weight, based on the weight of the reaction mixture, to remain unreacted.

Preferably, the monomers for preparing the polyacrylate resins (A1) are polymerized at a polymerization solids which is not too high, preferably at a polymerization solids of from 80 to 50% by weight, based on the comonomers, and then the solvents are removed in part by distillation, so that the resulting polyacrylate resin solutions have a solids content of preferably from 100 to 60% by weight.

The preparation of the polyacrylate resins (A1) has no special features in terms of its methodology but instead takes place by means of the methods of continuous or batchwise copolymerization that are known and customary in the polymers field, under atmospheric pressure or superatmospheric pressure, in stirred tanks, autoclaves, tube reactors or Taylor reactors.

Examples of suitable (co)polymerization processes are described in the patents DE-A-197 09 465, DE-C-197 09 476, DE-A-28 48 906, DE-A-195 24 182, EP-A-0 554 783, WO 95/27742, and WO 82/02387.

In accordance with the invention, Taylor reactors are advantageous and are therefore used with preference for the process of the invention.

Taylor reactors, which serve to convert substances under the conditions of Taylor flow, are known. They consist substantially of two coaxial concentric cylinders of which the outer is fixed and the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. In addition to the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$, and the gap width d, the difference between the two radii, in accordance with the following formula:

$$Ta = \omega_i r_i d v^{-1} (d/r_i)^{1/2} \qquad (I)$$

where $d = r_o - r_i$.

At low angular viscosity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. Any increase in the rotary speed is accompanied by an increase in the centrifugal force as well. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Accordingly, the flow system behaves as an ideal flow tube in that the vortex pairs pass through the gap with constant residence time, like ideal stirred tanks.

Of advantage in accordance with the invention here are Taylor reactors having an external reactor wall located within which there is a concentrically or eccentrically disposed rotor, a reactor floor, and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap broadens in the direction of flow traversal.

Suitable polyesters (A2) containing hydroxyl groups and acid groups which can be converted into the corresponding acid anion groups include all polyesters having the stated OH numbers, acid numbers, molecular weights, and viscosities.

Use is made preferably as component (A2) of polyesters obtainable by reacting p1) polycarboxylic acids or their esterifiable derivatives, together if desired with mono-carboxylic acids,
p2) polyols, together if desired with monools,
p3) if desired, further modifying components, and
p4) if desired, a component which is reactive with the reaction product of (p1), (p2) and, where used, (p3).

Examples that may be given of polycarboxylic acids that may be used as component (p1) are aromatic, aliphatic, and cycloaliphatic polycarboxylic acids. As component (p1) it is preferred to use aromatic and/or aliphatic polycarboxylic acids.

Examples of suitable polycarboxylic acids are phthalic acid, isophthalic acid, terephthalic acid, phthalic, isophthalic or terephthalic monosulfonate, halophthalic acids, such as tetrachlorophthalic or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, or cyclobutanetetracarboxylic acid. The cycloaliphatic polycarboxylic acids may be used either in their cis or in their trans form or as a mixture of both forms. Also suitable are the esterifiable derivatives of the aforementioned carboxylic acids, such as their monoesters or polyesters with aliphatic alcohols having from 1 to 4 carbon atoms or hydroxy alcohols having from 1 to 4 carbon atoms, for example. It is also possible to use the anhydrides of the abovementioned acids, where they exist.

If desired, together with the polycarboxylic acids it is also possible to use monocarboxylic acids, such as benzoic acid, tert-butylbenzoic acid, lauric acid, isononanoic acid, and fatty acids of naturally occurring oils, for example. Isononanoic acid is a preferred monocarboxylic acid used.

Suitable alcohol components (p2) for preparing the polyester (A2) are polyhydric alcohols, such as ethylene glycol, propanediols, butanediols, hexanediols, neopentyl hydroxypivalate, neopentyl glycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl isocyanate, polyethylene glycol, polypropylene glycol, alone or together with monohydric alcohols, such as butanol, octanol, lauryl alcohol, cyclohexanol, tert-butylcyclohexanol, ethoxylated and/or propoxylated phenols.

Compounds suitable as component (p3) for preparing the polyesters (A2) include in particular those having a group which is reactive toward the functional groups of the polyester, with the exception of the compounds specified as component (p4). As modifying component (p3) it is preferred to use polyisocyanates and/or diepoxide compounds, and also, if desired, monoisocyanates and/or monoepoxide compounds. Suitable components (p3) are described, for example, in DE-A-40 24 204 on page 4, lines 4 to 9.

Compounds suitable as component (p4) for preparing the polyesters (A2) are those compounds which in addition to a group that is reactive toward the functional groups of the polyester (A2) also contain a tertiary amino group, examples including monoisocyanates containing at least one tertiary amino group, or mercapto compounds containing at least one tertiary amino group. For details, refer to DE-A-40 24 204, page 4, lines 10 to 49.

The polyesters (A2) are prepared in accordance with the known methods of esterification, as is described, for example, in DE-A-40 24 204, page 4, lines 50 to 65. This reaction takes place usually at temperatures between 180 and 280° C., in the absence or presence of an appropriate esterification catalyst, such as lithium octoate, dibutyltin oxide, dibutyltin dilaurate or para-toluenesulfonic acid, for example.

The polyesters (A2) are normally prepared in the presence of small amounts of an appropriate solvent as entrainer. Examples of entrainers used include aromatic hydrocarbons, such as xylene in particular, and (cyclo)aliphatic hydrocarbons, e.g., cyclohexane.

As component (A2) it is particularly preferred to use polyesters which have been prepared by a two-stage process, by first preparing a hydroxyl-containing polyester having an OH number of from 100 to 300 mg KOH/g, an acid number of less than 10 mg KOH/g, and a number average molecular weight Mn of from 500 to 2 000 daltons, which is then reacted in a second stage with carboxylic anhydrides to give the desired polyester (A2). The amount of carboxylic anhydrides in this case is chosen so that the resulting polyester has the desired acid number. Acid anhydrides suitable for this reaction are all those commonly used, such as hexahydrophthalic anhydride, trimellitic anhydride, pyromellitic anhydride, phthalic anhydride, camphoric anhydride, tetrahydrophthalic anhydride, succinic anhydride, and mixtures of these and/or other anhydrides, and especially anhydrides of aromatic polycarboxylic acids, such as trimellitic anhydride, for example.

It is possible if desired for the polyacrylate resin (A1) to have been prepared at least in part in the presence of the polyester (A2). In this case, advantageously at least 20% by weight and with particular advantage from 40 to 80% by weight of the component (A1) are prepared in the presence of the component (A2).

Any remainder of the component (A1) is added subsequently to the binder solution. In this case it is possible for this already polymerized resin to have the same monomer composition as the polyacrylate resin synthesized in the presence of the polyester. Alternatively, a hydroxyl-containing polyacrylate resin having a different monomer composition may be added. Also possible is the addition of a mixture of different polyacrylate resins and/or polyesters, with possibly one resin having the same monomer composition as the polyacrylate resin synthesized in the presence of the polyester.

As the polyurethane resin (A3) containing hydroxyl and acid groups, suitable resins include all polyurethane resins having the OH numbers, acid numbers, molecular weights, and viscosities indicated.

Suitable polyurethane resins are described, for example, in the following documents: EP-A-355 433, DE-A-35 45 618, DE-A-38 13 866, DE-A-32 10 051, DE-A-26 24 442, DE-A-37 39 332, U.S. Pat. No. 4,719,132, EP-A-89 497, U.S. Pat. No. 4,558,090, U.S. Pat. No. 4,489,135, DE-A-36 28 124, EP-A-158 099, DE-A-29 26 584, EP-A-195 931, DE-A-33 21 180, and DE-A-40 05 961.

In component (I) it is preferred to use polyurethane resins which are preparable by reacting isocyanato-containing prepolymers with compounds that are reactive toward isocyanate groups.

The preparation of isocyanato-containing prepolymers may take place by reacting polyols having a hydroxyl number of from 10 to 1 800, preferably from 50 to 1 200 mg KOH/g with excess polyisocyanates at temperatures of up to 150° C., preferably from 50 to 130° C., in organic solvents which are unable to react with isocyanates. The equivalents ratio of NCO groups to OH groups is situated between 2.0:1.0 and >1.0:1.0, preferably between 1.4:1 and 1.1:1.

The polyols used to prepare the prepolymer may be of low molecular weight and/or high molecular weight and may contain groups that are slow to react and are anionic or capable of forming anions. It is also possible to use low molecular weight polyols having a molecular weight of from 60 up to 400 daltons to prepare the isocyanato-containing prepolymers. In this case amounts of up to 30% by weight of the overall polyol constituents are used, preferably from about 2 to 20% by weight.

In order to obtain an NCO prepolymer of high flexibility, a high fraction of a predominantly linear polyol having a preferred OH number of from 30 to 150 mg KOH/g should be added. Up to 97% by weight of the overall polyol may consist of saturated and unsaturated polyesters and/or polyethers having a number average molecular weight Mn of from 400 to 5 000 daltons. The selected polyetherdiols should not introduce excessive amounts of ether groups, since otherwise the polymers formed start to swell in water. Polyesterdiols are prepared by esterifying organic dicarboxylic acids or their anhydrides with organic diols, or derive from a hydroxycarboxylic acid or from a lactone. In order to prepare branched polyester polyols, it is possible to employ a minor proportion of polyols or polycarboxylic acids having a higher functionality.

The alcohol component used to prepare the polyurethane resins preferably consists at least to a certain extent of u$_1$) at least one diol of the formula (II)

(II)

in which $R_1$ and $R_2$ are each an identical or different radical and are an alkyl radical having from 1 to 18 carbon atoms, an aryl radical or a cycloaliphatic radical, with the proviso that $R_1$ and/or $R_2$ must not be methyl, and/or u$_2$) at least one diol of the formula (III)

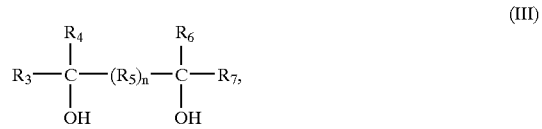

(III)

in which $R_3$, $R_4$, $R_6$ and $R_7$ are each identical or different radicals and are an alkyl radical having from 1 to 6 carbon atoms, a cycloalkyl radical or an aryl radical and $R_5$ is an alkyl radical having from 1 to 6 carbon atoms, an aryl radical or an unsaturated alkyl radical having from 1 to 6 carbon atoms, and n is either 0 or 1.

Suitable diols (u$_1$) are all propanediols of the formula (II) in which either $R_1$ or $R_2$ or $R_1$ and $R_2$ is or are other than methyl, such as 2-butyl-2-ethyl-1,3-propane-diol, 2-butyl-2-methyl-1,3-propanediol, 2-phenyl-2-methyl-1,3-propanediol, 2-propyl-2-ethyl-1,3-propane-diol, 2-di-tert-butyl-1,3-propanediol, 2-butyl-2-propyl-1,3-propanediol, 1-dihydroxymethylbicyclo-[2.2.1]heptane, 2,2-diethyl-1,3-propanediol, 2,2-dipropyl-1,3-propanediol, 2-cyclohexyl-2-methyl-1,3-propanediol, et cetera.

Examples of diols (u$_2$) (formula (III)) that may be used include 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butane-diol, 1,4-bis(2'-hydroxypropyl)benzene, and 1,3-bis-(2'-hydroxypropyl)benzene.

As diols (u$_1$) it is preferred to use 2-propyl-2-ethyl-1,3-propanediol, 2,2-diethyl-1,3-propanediol, 2-butyl-2-ethyl-1,3-propanediol, and 2-phenyl-2-ethyl-1,3-propanediol, and as component ($u_2$) it is preferred to use 2,3-dimethyl-2,3-butanediol and also 2,5-dimethyl-2,5-hexanediol. Particular preference is given to using 2-butyl-2-ethyl-1,3-propanediol and also 2-phenyl-2-ethyl-1,3-propanediol as component ($u_1$) and 2,5-dimethyl-2,5-hexanediol as component ($u_2$).

The diols ($u_1$) and/or ($u_2$) are commonly used in an amount of from 0.5 to 15% by weight, preferably from 1 to 7% by weight, based in each case on the overall weight of the synthesis components used to prepare the polyurethane resins (A3).

Typical multifunctional isocyanates used to prepare the polyurethane resins are aliphatic, cycloaliphatic and/or aromatic polyisocyanates containing at least two isocyanate groups per molecule. Preference is given to the isomers or isomer mixtures of organic diisocyanates. Owing to their good stability to ultraviolet light, (cyclo)aliphatic diisocyanates give rise to products having only a low tendency to yellow. The polyisocyanate component used to form the prepolymer may also contain a fraction of polyisocyanates of higher functionality, provided that no gelling is caused as a result. Products which have become established as triisocyanates are those formed by trimerization or oligomerization of diisocyanates or by reaction of diisocyanates with polyfunctional compounds containing OH or NH groups. The average functionality may be lowered if desired by adding monoisocyanates.

Examples of polyisocyanates that may be used include phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

To prepare high-solids polyurethane resin solutions, use is made in particular of diisocyanates of the general formula (IV)

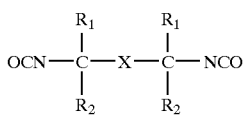

(IV)

where X is a divalent aromatic hydrocarbon radical, preferably an unsubstituted or halogen-, methyl- or methoxy-substituted naphthylene, diphenylene or 1,2-, 1,3- or 1,4-phenylene radical, with particular preference a 1,3-phenylene radical, and $R_1$ and $R_2$ are an alkyl radical having 1–4 carbon atoms, preferably a methyl radical. Diisocyanates of the formula (IV) are known (their preparation is described, for example, in EP-A-101 832, U.S. Pat. No. 3,290,350, U.S. Pat. No. 4,130,577, and U.S. Pat. No. 4,439,616) and some are available commercially (1,3-bis(2-isocyanatoprop-2-yl)benzene, for example, is sold by the American Cyanamid Company under the trade name TMXDI (META)®).

Further preferred as polyisocyanate components are diisocyanates of the formula (V):

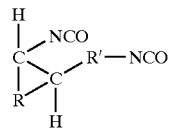

(V)

where: R is a divalent alkyl or aralkyl radical having from 3 to 20 carbon atoms and
R' is a divalent alkyl or aralkyl radical having from 1 to 20 carbon atoms.

Polyurethanes are generally incompatible with water unless specific constituents are incorporated and/or special preparation steps are taken in the course of their synthesis. To prepare the polyurethane resins it is thus possible to use compounds which contain two H-active groups that are reactive with isocyanate groups, and at least one group which ensures dispersibility in water. Suitable groups of this kind are nonionic groups (e.g., polyethers), anionic groups, mixtures of these two groups, or cationic groups.

Accordingly it is possible to build into the polyurethane resin an acid number which is sufficiently high that the neutralized product can be dispersed stably in water. For this purpose use is made of compounds containing at least one isocyanate-reactive group and at least one group capable of forming anions. Suitable isocyanate-reactive groups are, in particular, hydroxyl groups and also primary and/or secondary amino groups. Groups capable of forming anions are carboxyl, sulfonic acid and/or phosphonic acid groups. It is preferred to use alkanoic acids having two substituents on the alpha carbon atom. The substituent may be a hydroxyl group, an alkyl group or an alkylol group.

These polyols have at least one, generally from 1 to 3, carboxyl groups in the molecule. They have from 2 to about 25, preferably from 3 to 10, carbon atoms. The carboxyl-containing polyol may account for from 3 to 100% by weight, preferably from 5 to 50% by weight, of the overall polyol constituent in the NCO prepolymer.

The amount of ionizable carboxyl groups that is available by virtue of the carboxyl group neutralization in salt form is generally at least 0.4% by weight, preferably at least 0.7% by weight, based on the solids. The upper limit is approximately 12% by weight. The amount of dihydroxyalkanoic acids in the unneutralized prepolymer gives an acid number of at least 5 mg KOH/g, preferably at least 10 mg KOH/g. With very low acid numbers, it is generally necessary to take further measures to achieve dispersibility in water. The upper limit on the acid number is 150 mg KOH/g, preferably 40 mg KOH/g, based on the solids. The acid number is preferably situated within the range from 20 to 40 mg KOH/g.

The isocyanate groups of the isocyanato-containing prepolymer are reacted with a modifier. The modifier is preferably added in an amount such that instances of chain extension and thus of molecular weight increase occur. Modifiers used are preferably organic compounds containing hydroxyl and/or secondary and/or primary amino groups, especially polyols with a functionality of two, three and/or more. Examples of polyols which can be used include trimethylolpropane, 1,3,4-butane-triol, glycerol, erythritol, mesoerythritol, arabitol, adonitol, etc. Trimethylolpropane is used with preference.

To prepare the polyurethane resin (A3) it is preferred first to prepare an isocyanato-containing prepolymer from which the desired polyurethane resin is then prepared by further reaction, preferably chain extension. The reaction of the components takes place in accordance with the well-known processes of organic chemistry (cf., e.g., Kunststoff-Handbuch, Volume 7: Polyurethane, edited by Dr. Y. Oertel, Carl Hanser Verlag, Munich, Vienna, 1983). Examples of the preparation of the prepolymers are described in DE-A 26 24 442 and DE-A 32 10 051. The polyurethane resins may be prepared by the known methods (e.g., acetone method).

The components are preferably reacted in ethoxyethyl propionate (EEP) as solvent. The amount of EEP in this case may be variable within wide limits and should be sufficient for the formation of a prepolymer solution of appropriate viscosity. In general up to 70% by weight, preferably from 5 to 50% by weight, and with particular preference less than 20% by weight of solvent is used, based on the solids. Accordingly, the reaction may be carried out with very particular preference, for example, at a solvent content of 10–15% by weight EEP, based on the solids.

The reaction of the components may take place if desired in the presence of a catalyst, such as organotin compounds and/or tertiary amines. To prepare the prepolymers, the amounts of the components are chosen such that the equivalents ratio of NCO groups to OH groups is situated between 2.0:1.0 and >1.0:1.0, preferably between 1.4:1 and 1.1:1.

The NCO prepolymer contains at least about 0.5% by weight of isocyanate groups, preferably at least 1% by weight of NCO, based on the solids. The upper limit is approximately 15% by weight, preferably 10% by weight, with particular preference 5% by weight of NCO.

Suitable components (A4) are all water-dilutable binders that are compatible with the other constituents of component (I), examples of such binders being acrylated polyurethane resins and/or polyester acrylates.

Besides the constituents that are important to the invention and, where appropriate, the further binders (A), component (I) may include as constituent (B) all customary coatings pigments and/or fillers in fractions of from 0 to 60% by weight, based on component (I). In this context it is possible to use not only the pigments that are common in aqueous coating compositions and which do not react with water and/or do not dissolve in water but also the pigments commonly employed in conventional coating compositions. The pigments may comprise organic or inorganic compounds and may impart color and/or effect. The coating composition of the invention therefore ensures, owing to this large number of appropriate pigments, a universal scope for use, and permits the realization of a large number of shades.

As effect pigments it is possible to use metal flake pigments, such as commercially customary aluminum bronzes, aluminum bronzes chromated in accordance with DE-A-36 36 183, and commercially customary stainless steel bronzes, and also nonmetallic effect pigments, such as pearlescent pigments and interference pigments for example. Examples of suitable inorganic color pigments are titanium dioxide, iron oxides, Sicotrans yellow, and carbon black. Examples of suitable organic color pigments are indanthrene blue, Cromophthal red, Irgazine orange and Heliogen green. Examples of suitable fillers are chalk, calcium sulfates, barium sulfate, silicates such as talc or kaolin, silicas, oxides such as aluminum hydroxide or magnesium hydroxide, nanoparticles or organic fillers such as textile fibers, cellulose fibers, polyethylene fibers or wood flour.

As a further key constituent (C), component (I) includes at least one organic solvent which may be dilutable in water. Such solvents may also participate in the reaction with the crosslinking component (II) and may therefore act as reactive diluents.

Examples of suitable solvents are the compounds already specified in the context of the preparation of the polyacrylate resins (A1) (see above). Also suitable are esters, ketones, keto esters, glycol ethers such as ethylene, propylene or butylene glycol ethers, glycol esters such as ethylene, propylene or butylene glycol esters, or glycol ether esters such as ethoxyethyl propionate and isopropoxypropanol. Further suitable solvents include aliphatic and aromatic solvents such as dipentene, xylene or Shellsol$^R$.

The solvents (C) may further consist in whole or in part of low molecular weight oligomeric compounds, which may be unreactive or else reactive toward the crosslinking component (II). Where they are reactive, they comprise thermally crosslinkable reactive diluents.

Examples of suitable thermally crosslinkable reactive diluents are described above.

As constituent (D) component (I) comprises, if desired, at least one neutralizing agent. Examples of suitable neutralizing agents are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine, and the like. Neutralization may be effected in organic phase or in aqueous phase. Dimethylethanolamine is a preferred neutralizing agent used.

The amount of neutralizing agent (D) used in total in the coating composition of the invention is chosen such that from 1 to 100 equivalents, preferably from 50 to 90 equivalents, of the acid groups of the binder (A) are neutralized. The neutralizing agent (D) may be added to component (I), (II) and/or (III). Preferably, however, the neutralizing agent (D) is added to component (III).

As constituent (E) component (I) may comprise at least one rheology control additive. Examples of suitable rheology control additives are those known from the patents WO 94/22968, EP-A-0 276 501, EP-A-0 249 201, and WO 97/12945; crosslinked polymeric microparticles, as disclosed for example in EP-A-0 008 127; inorganic phyllosilicates such as aluminum magnesium silicates, sodium magnesium phyllosilicates, and sodium magnesium fluorine lithium phyllosilicates of the montmorillonite type; silicas such as Aerosils; or synthetic polymers containing ionic and/or associative groups, such as polyvinyl alcohol, poly (meth)acrylamide, poly(meth)-acrylic acid, polyvinylpyrrolidone, styrene-maleic anhydride or ethylene maleic anhydride copolymers and their derivatives, or hydrophobically modified ethoxylated urethanes or polyacrylates. Preferred rheology control additives used are polyurethanes.

Component (I) may further comprise at least one additional customary coatings additive (E). Examples of such additives are defoamers, dispersing auxiliaries, emulsifiers, and leveling agents.

Of course, said additives (E) may also be added separately to the coating composition. In this case the additives (E) are then referred to as component (IV).

To prepare the coating compositions of the invention it is preferred to use components (I) which consist of from 20 to 90, preferably from 30 to 80, with particular preference from 40 to 75, and in particular from 45 to 70% by weight of the constituent of the invention, from 0 to 40% by weight of at least one of the polymeric or oligomeric resins (A1), (A2) and/or (A3) and if appropriate (A4), from 0 to 60% by weight of at least one pigment and/or filler (B), from 5 to 50% by weight, preferably from 10 to 40% by weight, of at least one organic, optionally water-dilutable solvent (C), from 0 to 20% by weight, preferably from 0.1 to 10% by weight, of at least one neutralizing agent (D), and from 0 to 20% by weight, preferably from 2 to 10% by weight, of at least one customary auxiliary and/or additive (E) (coatings additive), the sum of the weight fractions of the components being in each case 100% by weight.

The further key constituent of the coating composition of the invention is at least one crosslinking agent (F) which is present in component (II).

The crosslinking agents (F) comprise at least one diisocyanate and/or polyisocyanate (F) which if desired is dispersed or dissolved in one or more organic, optionally water dilutable solvents.

The polyisocyanate component (F) comprises organic polyisocyanates, especially those known as paint polyisocyanates, containing free isocyanate groups attached to aliphatic, cycloaliphatic, araliphatic and/or aromatic moieties. Preference is given to using polyisocyanates containing from 2 to 5 isocyanate groups per molecule and having viscosities of from 100 to 10 000, preferably from 100 to 5 000, and, where manual mixing of components (I), (II) and (III) is envisaged, in particular from 1 000 to 2 000 mPas (at 23° C.). If desired, small amounts of organic solvent may be added to the polyisocyanates, preferably from 1 to 25% by weight based on straight polyisocyanate, in order thus to improve the ease of incorporation of the isocyanate and, where appropriate, to lower the viscosity of the polyisocyanate to a level within the aforementioned ranges. Examples of suitable solvent additives for the polyisocyanates are ethoxyethyl propionate and butyl acetate. Furthermore, the polyisocyanates may have been conventionally hydrophilically or hydrophobically modified.

Examples of suitable isocyanates are described by way of example in "Methoden der organischen Chemie", Houben-Weyl, Volume 14/2, 4th Edition, Georg Thieme Verlag, Stuttgart 1963, pages 61 to 70, and by W. Siefken, Liebigs Annalen der Chemie, Volume 562, pages 75 to 136. Suitable examples include the isocyanates specified in the context of the description of the polyurethane resins (A3), and/or isocyanato-containing polyurethane prepolymers which may be prepared by reacting polyols with an excess of polyisocyanates and which are preferably of low viscosity.

Further examples of suitable polyisocyanates are isocyanato-containing polyurethane prepolymers which can be prepared by reacting polyols with an excess of polyisocyanates and are preferably of low viscosity. It is also possible to use polyisocyanates containing isocyanurate, biuret, allophanate, iminooxadiazine-dione, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexyl-methane 4,4'-diisocyanate or 1,3-bis(isocyanatomethyl)-cyclohexane, diisocyanates derived from dimer fatty acids, as sold under the commercial designation DDI 1410 by Henkel, 1,8-diisocyanato-4-isocyanatomethyl-octane, 1,7-diisocyanato-4-isocyanatomethylheptane or 1-isocyanato-2-(3-isocyanatopropyl)cyclohexane, or mixtures of these polyisocyanates.

Very particular preference is given to using mixtures of polyisocyanates containing uretdione and/or isocyanurate and/or allophanate groups and based on hexamethylene diisocyanate, as formed by catalytic oligomerization of hexamethylene diisocyanate using appropriate catalysts. The polyisocyanate constituent may further comprise any desired mixtures of the free polyisocyanates exemplified.

The coating composition of the invention may further comprise isocyanato-free crosslinking agents (F'). Depending on their reactivity, these may be present in components (I), (II) and/or (III); the critical factor is that the crosslinking agents (F') do not adversely affect the storage stability of the component in question, such as by premature crosslinking. The skilled worker will therefore be able to select the appropriate combinations of crosslinking agents (F') on the one hand and components (I), (II) and/or (III) on the other in a simple manner.

Examples of suitable crosslinking agents (F') are blocked diisocyanates and/or polyisocyanates based on the aforementioned diisocyanates and/or polyisocyanates (F). Examples of suitable blocking agents are aliphatic, cycloaliphatic or araliphatic monoalcohols such as methyl, butyl, octyl or lauryl alcohol, cyclohexanol or phenylcarbinol; hydroxylamines such as ethanolamine; oximes such as methyl ethyl ketone oxime, acetone oxime or cyclohexanone oxime; amines such as dibutylamine or diisopropylamine; CH-acidic compounds such as malonic diesters or ethyl acetoacetate; heterocycles such as dimethylpyrazol; and/or lactams such as epsilon-caprolactam. These crosslinking agents (F') may be present in components (I), (II) and/or (III).

Further examples of suitable crosslinking agents (F') are polyepoxides (F'), especially all known aliphatic and/or cycloaliphatic and/or aromatic polyepoxides, based for example on bisphenol A or bisphenol F. Examples of suitable polyepoxides (F') also include the polyepoxides available commercially under the designations Epikote® from Shell, and Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether). These crosslinking agents (F') may be present in components (I) and/or (III).

As crosslinking agents (F') it is also possible to use tris(alkoxycarbonylamino)triazines of the formula

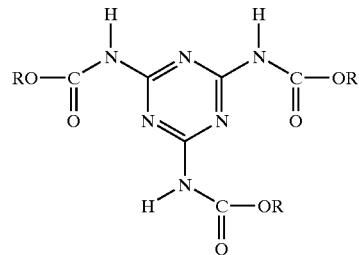

These crosslinking agents (F') may be present in components (I) and/or (III).

Examples of suitable tris (alkoxycarbonylamino) triazines (F') are described in the patents U.S. Pat. No. 4,939,213, U.S. Pat. No. 5,084,541, and EP-A-0 624 577. The tris (methoxy-, tris(butoxy- and/or tris(2-ethyl-hexoxycarbonylamino)-triazines are used in particular.

The methyl butyl mixed esters, the butyl 2-ethylhexyl mixed esters, and the butyl esters are of advantage. They have the advantage over the straight methyl ester of better solubility in polymer melts, and also have less of a tendency to crystallize.

In particular it is possible to use amino resins, examples being melamine resins, as crosslinking agents (F'). In this context it is possible to use any amino resin suitable for transparent topcoat materials or clearcoat materials, or a mixture of such amino resins. Particularly suitable are the customary and known amino resins some of whose methylol and/or methoxymethyl groups have been defunctionalized by means of carbamate or allophanate groups. Crosslinking agents of this type are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207. These crosslinking agents (F') may be present in components (I) and/or (III).

Further examples of suitable crosslinking agents (F') are beta-hydroxylalkylamides such as N,N,N',N'-tetra-kis(2-hydroxyethyl)adipamide or N,N,N',N'-tetrakis-(2-hydroxypropyl)adipamide. These crosslinking agents (F') may be present in components (I) and/or (III).

Further examples of suitable crosslinking agents (F') are siloxanes, especially siloxanes containing at least one trialkoxy- or dialkoxysilane group. These crosslinking agents (F') may be present in components (I), (II) and/or (III).

The polyisoscyanates (F) are advantageously used in an amount of at least 70% by weight, with particular preference in an amount of from 80 to 100% by weight, based on the overall weight of the crosslinking agents (F) and (F') in the coating composition of the invention.

The constituents (G) and (H) of component (II) correspond to the constituents (C) and (E) of component (I), except that here constituents are used which do not react with isocyanate groups.

To prepare the coating compositions of the invention it is preferred to use components (II) which consist of (F) from 50 to 100% by weight, preferably from 60 to 90% by weight, of at least one crosslinking agent (F), (G) from 0 to 50% by weight, preferably from 10 to 40% by weight, of at least one organic, optionally water dilutable solvent, and (H) from 0 to 20% by weight, preferably from 0 to 10% by weight, of at least one customary auxiliary and/or additive, the sum of the weight fractions of components (F) to (H) being in each case 100% by weight.

The further key constituent of the coating composition of the invention is component (III).

In accordance with the invention, this component (III) consists of or comprises water. It is of advantage in accordance with the invention if component (III) includes further suitable constituents in addition to water.

Examples of suitable component (III) constituents are the constituents described above that are important to the invention, the further binders (A), especially the polymeric or oligomeric resins (A1), (A2) and/or (A3) and, where appropriate, (A4), and also the above-described reactive diluents.

Alternatively, said constituents may be in the form of a powder slurry. In this case the further flame retardants (F') may be present in the powder slurry particles. Powder slurries are customary and known and are described, for example, in the patents EP-A-0 652 264, U.S. Pat. No. 4,268,542, DE-A-196 13 547, and DE-A-195 18 392.

For preparing the coating compositions of the invention it is very particularly preferred to use components (III) which consist of (J) from 40 to 90% by weight, preferably from 50 to 85% by weight, of water, (K) from 5 to 50% by weight, preferably from 10 to 45% by weight, of the binder (A), especially the polymeric or oligomeric resins (A1), (A2) and/or (A3) and, where appropriate, (A4), in a form dispersed in water, (L) from 0 to 20% by weight, preferably from 2 to 10% by weight, of at least one neutralizing agent, and (M) from 0 to 20% by weight, preferably from 2 to 10% by weight, of at least one customary auxiliary and/or additive (coatings additive), the sum of the weight fractions of components (J) to (M) being in each case 100% by weight.

The constituents (L) and (M) of component (III) correspond to the constituents (D) and (E) of component (I).

The component (III) consisting of the water-dispersed form of component (A) and therefore of the water-dispersed form of the binders (A1), (A2) and/or (A3) and, where appropriate, (A4) may on the one hand be prepared by preparing the components in organic solvent, then neutralizing the acid groups, especially carboxyl groups, with the neutralizing agent (L) and, finally, introducing the neutralized constituents into deionized water, or on the other hand may be prepared by emulsion polymerization of the monomeric building blocks of the binders (A) in water.

Preferably, components (A1), (A2) and/or (A3) and, where appropriate, (A4) are first prepared in organic solvents, then neutralized and, finally, dispersed in water in neutralized form.

In the course of the preparation of the water-dispersed form of the polyacrylate resins (A1), the polymerization in the organic solvent is preferably conducted in a plurality of stages with separate monomer and initiator feeds. With very particular preference, the polyacrylate resin (A1) is prepared by the two-stage process already described above, by 1. polymerizing a mixture of (a1), (a2), (a4), (a5), and (a6), or a mixture of portions of components (a1), (a2), (a4), (a5), and (a6), in an organic solvent, 2. after at least 60% by weight of the mixture consisting of (a1), (a2), (a4), (a5), and, where used, (a6) have been added, adding (a3) and any remainder of components (a1), (a2), (a4), (a5), and (a6), and continuing polymerization, and 3. after the end of the polmerization, subjecting the resulting polyacrylate resin (A1) if desired to at least partial neutralization.

Examples of suitable neutralizing agents (L) as used in step 3. are the ammonia, ammonium salts and amines (constituent (D) of component (I)) already described in connection with the preparation of component (I), it being possible for the neutralization to take place in organic phase or in aqueous phase. The total amount of neutralizing agent (L) used to neutralize component (A1) is chosen so that from 1 to 100 equivalents, preferably from 50 to 90 equivalents, of the acid groups of the binder (A1) are neutralized.

Used with preference as constituents (A2) in component (III) are polyesters (A2) which have been prepared by a two-stage process comprising first preparing a hydroxyl-containing polyester having an OH number of from 100 to 300 mg KOH/g, an acid number of less than 10 mg KOH/g, and a number average molecular weight Mn of from 500 to 2 000 daltons, which is then reacted in a second stage with carboxylic anhydrides to give the desired polyester (A2).

The amount of carboxylic anhydrides is chosen such that the resulting polyester has the desired acid number.

After the end of the reaction, the polyester (A2) is subjected to at least partial neutralization, in which case it is again possible to use the neutralizing agent (L) (constituent (D) of component (I)) already described in connection with the preparation of component (I), and for the neutralization to take place in organic phase or in aqueous phase.

To prepare the polyurethane resins (A3) for component (III) it is preferred first to prepare an isocyanato-containing prepolymer from which the polyurethane resin (A3) is then prepared by further reaction, preferably by chain extension.

After the end of the polymerization, the resulting polyurethane resin is subjected to at least partial neutralization, in which case it is again possible to use the ammonia, ammonium salts and amines neutralizing agent (L) as suitable (constituent (D) of component (I)) already described in connection with the preparation of component (I), and for the neutralization to take place in organic phase or in aqueous phase.

Suitable components (A4) which are additionally present where appropriate are all water dilutable and/or water dispersible binders that are compatible with the other constituents of component (III), examples of such binders including acrylated polyurethane resins and/or polyester acrylates.

Furthermore, based on its overall amount, the coating composition of the invention may contain up to 40% by weight of constituents (N) which are curable with actinic light, especially UV radiation, and/or electron beams. These constituents may be present in component (I), (II) and/or (III), especially in component (I). This affords the advantage that the coating compositions of the invention are curable both thermally and by radiation.

Suitable constituents (N) include in principle all low molecular mass, oligomeric and polymeric compounds that are curable with actinic light and/or electron beams, such compounds being as commonly used in the field of UV curable or electron beam curable coating compositions. These radiation curable coating compositions normally include at least one, preferably two or more, radiation curable binders, based in particular on ethylenically unsaturated prepolymers and/or ethylenically unsaturated oligomers, one or more reactive diluents, where appropriate, and one or more photoinitiators, where appropriate.

Advantageously, the constituents (N) used are radiation curable binders. Examples of suitable such binders (N) include (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders (N) that are free from aromatic structural units. Preference is therefore given to using urethane (meth)acrylates and/or polyester (meth)acrylates, with particular preference aliphatic urethane acrylates.

To prepare the coating compositions, components (I), (II) and (III) are used preferably in amounts such that the equivalents ratio of hydroxyl groups of the constituent that is important to the invention, where appropriate of the constituents (A1), (A2) and/or (A3) and, where appropriate, (A4) and also of the thermally curable reactive diluents, where appropriate, to the crosslinking groups of the crosslinking agent (F) and also, where appropriate, (F') is situated between 1:2 and 2:1, preferably between 1:1.2 and 1:1.5.

Furthermore, the coating compositions of the invention preferably comprise in total from 5 to 40% by weight, preferably from 10 to 30% by weight, of constituents that are important to the invention, from 15 to 60% by weight, preferably from 20 to 50% by weight, of binders (A), from 5 to 30% by weight, preferably from 10 to 20% by weight, of crosslinking agents (F), from 5 to 25% by weight, preferably from 10 to 20% by weight, of organic solvents (C), from 20 to 60% by weight, preferably from 25 to 50% by weight, of water, from 0 to 50% by weight, preferably from 0 to 30% by weight, of pigments and/or fillers (B), from 0 to 10% by weight of customary coating additives (E), and from 0 to 40% by weight of constituents (N) curable with actinic light, especially UV radiation, and/or electron beams based in each case on the overall weight of the coating composition of the invention.

The preparation of component (I) takes place in accordance with methods known to the skilled worker by mixing and, where appropriate, dispersing of the individual constituents. For example, color pigments (B) are normally incorporated by grinding (dispersing) the respective pigments in one or more binders. The dispersing of the pigments takes place with the aid of customary apparatus, such as bead mills and sand mills, for example.

Components (II), (III) and, where appropriate, (IV) are likewise prepared in accordance with methods well known to the skilled worker, by mixing and/or dispersing of the individual constituents.

The coating compositions of the invention are prepared in particular by the following mixing method from components (I), (II), (III) and, where appropriate, (IV):

To prepare the coating compositions of the invention, first of all components (I) and (II) are mixed, these components (I) and (II) preferably containing no neutralizing agent. Then component (IV), where appropriate, is added to this mixture. Then either the resulting mixture is added to component (III) comprising neutralizing agent (L) and the resulting coating composition is dispersed, or component (III) comprising neutralizing agent (L) is added to the resulting mixture.

Furthermore, the coating composition of the invention may be prepared in analogy to the process just described, in which case, however, the neutralizing agent (L) is not present in component (III) but is instead added separately prior to the addition of component (III).

Furthermore, the coating composition of the invention may also be prepared by first adding the neutralizing agent (L) to component (I). Instead of this mixing it is of course also possible to use a component (I) which already contains the neutralizing agent (L). The resulting component (I) is then mixed with component (II) and, where appropriate, with component (IV) (simultaneous or successive mixing with (II) and, where appropriate (IV)), then either the resulting mixture is added to component (III) or component (III) is added to the resulting mixture, and the coating composition thus obtained in each case is homogenized by dispersing.

The coating compositions of the invention may be applied to any desired substrates, such as metal, wood, plastic, glass or paper, for example, by customary application methods, such as spraying, knife coating, brushing or dipping, for example.

Because of their composition, the coating compositions of the invention are curable both thermally and by means of radiation. Thermal curing and radiation curing may take place simultaneously. In accordance with the invention it is of advantage to carry out the two curing steps in succession, and so this method is employed with preference. Outstanding results are obtained if the thermal curing is carried out before the radiation curing, and so this method is employed with very particular preference in accordance with the invention.

When used in automotive refinish, the coating compositions of the invention are cured commonly at temperatures of below 120° C., preferably at temperatures of not more than 80° C. When used in automotive OEM finishing, higher curing temperatures are also employed.

The curing of the coating compositions of the invention by radiation, especially UV radiation, has no special features in terms of its methodology but is instead carried out in customary and known units under the conditions described, for example, by R. Holmes in U.V. and E.B. Curing Formulations for Printing Inks, Coatings and Paints, SITA Technology, Academic Press, London, United Kingdom 1984, or by D. Stoye and W. Freitag (editors) in Paints, Coatings and Solvents, Second, Completely Revised Edition, Wiley-VCH, Weinheim, New York, 1998.

The coating compositions of the invention are preferably used to produce topcoats. The coating compositions of the invention may be used both in the OEM finishing and in the refinish of automobile bodies. However, they are preferably used in the area of refinish and the finishing of plastics parts.

The aqueous coating compositions of the invention may be used as primer-surfacers and also to produce single-coat topcoats, and also as pigmented basecoat materials or as clearcoat materials in a process for producing a multicoat system (basecoat-clearcoat process).

EXAMPLES AND COMPARATIVE EXPERIMENT

Preparation Example 1

The Preparation of a Polyacrylate Resin (A1-1)

25 kg of ethoxyethyl propionate (EEP) were weighed into a 100 kilogram steel reactor suitable for polymerization and equipped with monomer feed, initiator feed, temperature measurement means, oil heating and reflux condenser, and were heated to 130° C. A mixture of 7.13 kg of butyl methacrylate, 5.72 kg of methyl methacrylate, 5.96 kg of styrene, 3.16 kg of lauryl methacrylate and 6.76 kg of hydroxyethyl acrylate was metered in at a uniform rate with stirring over the course of four hours. The initiator feed was started five minutes before this feed. The initiator solution (2.74 kg of tert-butyl peroxyethylhexanoate in 4.48 kg of EEP) was metered in at a uniform rate over 4.5 hours. After 2.5 hours of the metering time of the first monomer feed, the second monomer feed was started. It consisted of 2.8 kg of hydroxyethyl acrylate, 1.36 kg of acrylic acid and 0.68 kg of EEP and was metered in at a uniform rate over 1.5 hours.

This gave the polyacrylate resin (A1-1) having a solids content of 79.2% (one hour; 130° C.), an acid number of 31.1 mg KOH/g and a viscosity of 4.4 dPas (55% in EEP).

Preparation Example 2

The Preparation of a Polyester Resin Precursor

A 4 liter steel reactor suitable for polycondensation reactions was charged with 1 088 g of neopentyl glycol hydroxypivalate, 120 g of phthalic anhydride, 1 268 g of isophthalic acid, 21 g of butylethylpropanediol, 489 g of neopentyl glycol and 113 g of xylene. This initial charge was then heated and the water of condensation was removed continuously until an acid number of 3.5 mg KOH/g was reached. Thereafter a solids content of 79.7% was set using EEP. The acid number of the resulting polyester resin was 4.4 mg KOH/g, its viscosity 3.6 dPas (60% in EEP).

Preparation Example 3

The Preparation of a Water-dispersed Polyurethane Resin (A3)

A 4 liter steel reactor suitable for polyurethane resin synthesis was charged with 749 g of the polyester resin precursor from preparation example 2, 6.6 g of ethylbutylpropanediol, 69 g of dimethylolpropionic acid and 318 g of m-tetramethylxylylene diisocyanate and this initial charge was left to react at a product temperature of 110° C. until a constant isocyanate content was reached. Then 101 g of trimethylolpropane were added in one portion and heating was continued until the reaction had ended. Subsequently 31.5 g of EEP were added. After stirring for 30 minutes, the product was neutralized with 36.7 g of dimethylethanolamine. The resultant polyurethane resin (A3) was dispersed at from 90 to 110° C. in 1 929.2 g of water whose temperature was 60° C. The resultant dispersion was free from gel particles, was homogeneous, and had a solids content of 36.1%, an acid number of 30.3 mg KOH/g, and a pH of 7.1. The dispersion was stable on storage at 40° C. for longer than four weeks.

Preparation Example 4

The Preparation of a Water-dispersed Polyacrylate Resin (A1-2)

The polyacrylate resin was prepared in a 4 liter steel rector with stirrer, reflux condenser, 2 monomer feeds and one initiator feed. 385 g of n-butanol were introduced as initial charge and heated to 110° C. Over the course of five hours, a mixture of 255 g of butyl methacrylate, 197 g of methyl methacrylate, 181 g of styrene, 113 g of Methacrylester 13 (methacrylic alkyl ester from Rohm & Haas) and 215 g of hydroxyethyl acrylate was metered in. After 3.5 hours of the first monomer feed, a second monomer feed comprising 113 g of hydroxyethyl methacrylate and 58 g of acrylic acid was started and was metered in at a uniform rate over the course of 1.5 hours. Subsequently, polymerization was continued for two hours. Following neutralization with 63 g of dimethylethanolamine, the product was stirred for a further 30 minutes. The resultant neutralized polyacrylate resin (A1-2) was dispersed in 1 338 g of deionized water. The organic solvent was distilled off in vacuo to a residual content <1.5%. After the solids content had been adjusted to 39.9% using deionized water, the resultant dispersion was characterized. Its pH was 7.2, its acid number 41.4 mg KOH/g. It exhibited pseudoplasticity and was stable on storage at 40° C. for more than four weeks.

Preparation Example 5

The Preparation of a Polyacrylate Resin 1 Containing Polyether Groups and Intended for use in Accordance With the Invention (Inventive Constituent)

A 4 1 stainless steel reactor suitable for polymerization reactions and equipped with monomer feed, initiator feed, stirrer and reflux condenser was charged with 1 421 g of ethoxyethyl propionate and this initial charge was heated to 140° C. Over the course of four hours, a mixture of 231 g of butyl methacrylate, 261 g of methyl methacrylate, 271 g of styrene, 300 g of polyethylene glycol monomethacrylate and 437 g of hydroxyethyl acrylate was metered in at a uniform rate. Five minutes before this feed, the feed of a mixture of 125 g of tert-butyl peroxyethylhexanoate and 204 g of ethoxyethyl propionate was started, the total metering time of the initiator feed being 4.5 hours. After two hours of subsequent polymerization, the solvent was removed in vacuo so as to give a solids content (one hour; 130° C.) of 80% by weight. The solids content was subsequently adjusted to about 75% by weight using butyl glycol. The viscosity of the inventive constituent (55% in ethoxyethyl propionate) was 3.6 dpas.

Preparation Example 6

The Preparation of a Polyacrylate Resin 2 Containing Polyether Groups and Intended for use in Accordance With the Invention (Inventive Constituent)

Preparation example 5 was repeated but using methoxypolyethylene glycol methacrylate instead of polyethylene glycol monomethacrylate. The result was an inventive constituent with a solids content of 74.6% by weight (one hour; 130° C.) and a viscosity (55% in ethoxyethyl propionate) of 3.0 dpas.

Examples 1 and 2 and Comparative Experiment C1

1.1 Preparation of Inventive Clearcoat Materials (Examples 1 and 2) and of a Noninventive Clearcoat Material (Comparative Experiment C1)

To prepare components (I), (II) and (III), and the clearcoat materials, the constituents indicated in table 1 were mixed with one another using a stirrer (600 rpm). For application, the clearcoat materials were adjusted to a viscosity of 35 s (DIN 4 cup).

TABLE 1

The composition of the inventive clearcoat materials (examples 1 and 2) and of the noninventive clearcoat material (comparative experiment C1)

| Constituents | Example 1 (parts by wt) | Example 2 (parts by wt) | Comparative experiment C1 (parts by wt) |
| --- | --- | --- | --- |
| Component (I) | | | |
| Polyacrylate resin 1[a)] | 15.5 | | |
| Polyacrylate resin 2[b)] | | 15.5 | |
| Polyacrylate resin (A1)[c)] | | | 15.0 |
| Dimethylethanol amine | | | 0.5 |
| Butyl glycol | 2 | 2 | 2 |
| Butyl glycol acetate | 3 | 3 | 3 |
| Surfynol[R] 104[d)] | 1 | 1 | 1 |
| Byk[R] 331[e)] | 0.3 | 0.3 | 0.3 |
| Byk[R] 325[f)] | 0.3 | 0.3 | 0.3 |
| Tinuvin[R] 292[g)] | 0.5 | 0.5 | 0.5 |
| Tinuvin[R] 1130[h)] | 0.4 | 0.4 | 0.4 |
| | 23 | 23 | 23 |
| Component (II) | | | |
| Desmodur[R] VPLS 2102[i)] | 2.5 | 2.5 | 2.5 |
| Desmodur[R] VPLS 2025/1[j)] | 12 | 12 | 12 |
| Ethoxyethyl propionate | 2.5 | 2.5 | 2.5 |
| | 17 | 17 | 17 |

TABLE 1-continued

The composition of the inventive clearcoat materials (examples 1 and 2) and of the noninventive clearcoat material (comparative experiment C1)

| Constituents | Example 1 (parts by wt) | Example 2 (parts by wt) | Comparative experiment C1 (parts by wt) |
| --- | --- | --- | --- |
| Component (III) | | | |
| DI water | 30 | 30 | 30 |
| Dapral[R] T210[k)] | 2 | 2 | 2 |
| Polyacrylate dispersion[l)] | 10 | 10 | 10 |
| Polyurethane dispersion[m)] | 18 | 18 | 18 |
| | 60 | 60 | 60 |

[a)]inventive constituent from preparation example 5
[b)]inventive constituent from preparation example 6
[c)]polyacrylate resin (A1-1) from preparation example 1
[d)]commercial wetting agent
[e),f)]commercial leveling agents from Byk Gulden
[g),h)]commercial light stabilizers from Ciba-Geigy
[i)]commercial polyisocyanate from Bayer AG (allophanate based on hexamethylene diisocyanate, having an isocyanate content of 20% and a viscosity of <2000 mPas)
[j)]commercial polyisocyanate from Bayer AG (isocyanurate based on hexamethylene diisocyanate, having an isocyanate content of 22.5 percent and a viscosity of <2000 mPas)
[k)]commercial dialkyl polyglycol ether from Akzo
[l)]water-dispersed polyacrylate resin (A1-2) from preparation example 4
[m)]water-dispersed polyacrylate resin (A3) from preparation example 3

1.2 The Production of Inventive and Noninventive Coatings and Test Panels

Steel panels coated conventionally with an electrodeposition coating material and a primer-surfacer were coated with a black basecoat material in a thickness of from 12 to 15 μm. The basecoat was dried initially at 80° C. for 10 minutes. Thereafter the clearcoat materials were applied at different film thicknesses. Subsequently, the test panels were baked at 140° C.

Table 2 gives an overview of the application conditions and film thicknesses

TABLE 2

Application conditions and film thicknesses

| | Film thicknesses | | |
| --- | --- | --- | --- |
| Application conditions | Example 1 (μm) | Example 2 (μm) | Comparative experiment C1 (μm) |
| 1 tp + 1 sp | 35 | 35 | 35 |
| 1 tp + 2 sp | 50 | 60 | 60 |
| 1 tp + 3 sp | 70 | 80 | 75 |
| 1 tp + 4 sp | 80 | 95 | 80 | tp = tie pass (application in a thin film)
sp = spray pass

In all cases the popping limit was 60 μm; there were ly a few, fine pinholes.

The gloss at 20° in accordance with DIN 67530 was 8 in the case of example 1, 25 in the case of example 2, and for comparative experiment C1 was measured as 88.

The resistance to gasoline and diesel was tested as follows: the coated test panels were dried in air at 23° C. for 24 hours. Then filter pads with a diameter of 2.3 cm were placed on the test panels. Using a pipette, 0.75 ml of supergrade gasoline or diesel (no older than four weeks) were trickled onto the filter pads, which were immediately subjected to weights of 100 g. After 5 minutes, the weights and the filter pads were removed. The excess gasoline or diesel was removed and the exposure sites were immediately examined for marks. In the case of examples 1 and 2 and also of comparative experiment C1 there were only a few marks in the case of gasoline, and no marks in the case of diesel.

The test panels were subjected to the constant condensation climate test (CCC test) in accordance with DIN 50017 and 53209.

The blistering was evaluated in accordance with DIN 53209. The frequency and size of the blisters per unit area were assessed. A further differentiation was made between medium sized (m) and large (g) blisters.

The existing swelling of the coatings was assessed in comparison to an unexposed test panel and was rated as follows:

| Code | Description |
|---|---|
| 0 | unchanged |
| 1 | changed by a trace |
| 2 | slightly changed |
| 3 | moderately changed |
| 4 | severely changed |
| 5 | very severely changed |

The color change was rated as follows:

| Rating | Description |
|---|---|
| 0 | none |
| 1 | a trace |
| 2 | slight |
| 3 | moderate |
| 4 | severe |
| 5 | very severe |

Table 3 gives an overview of the test results.

TABLE 3

Results of the CCC test

| Test conditions and parameters | Example 1 | Example 2 | Comparative experiment C1 |
|---|---|---|---|
| Three days: | | | |
| Swelling | 0 | 0 | m0/g1 |
| Color change | 0–1 | 3 | 5 |
| Remarks | no swelling | no swelling | |
| Six days: | | | |
| Swelling | 0 | 0 | m1/g3 |
| Color change | 1 | 2 | 5 |
| Remarks | no swelling | no swelling | marginal blisters highly swollen |
| Ten days: | | | |
| Swelling | 0 | 0 | m1/g5 |
| Color change | 1 | 3 | 5 |
| Remarks | no swelling | no swelling | marginal blisters highly swollen |
| Regeneration | satisfactory | satisfactory very slightly darker | slight swelling haze blister margins |

The test results demonstrate the extremely high stability of the clearcoats of the invention.

The adhesion of the clearcoats was determined using the cross-hatch test, including the cross-cut test, in accordance with DIN ISO 2409: 1994-10 before and after the water spray (WS) test. In each cycle of the test, the test panels were weathered in a controlled-climate chamber at a test chamber temperature of 18–28° C. for two days, during which they were sprayed with DI water using an aerosol device for 5 minutes per hour, and were then regenerated for one day. Assessments were also made, as indicated above, of the blisters, swelling, and color change.

Table 4 gives an overview of the test results obtained.

The test results underscore the high stability and adhesion of the clearcoats of the invention.

TABLE 4

Results of the WS test

| Test conditions Test methods Parameters | Comparative experiment C1 | Example 1 | Example 2 |
|---|---|---|---|
| 0 cycles: | | | |
| Cross-hatch | 0 | 0 | 0 |
| Cross-cut | 3 | 1–2 | 1 |
| 2 cycles: | | | |
| Cross-hatch | 0 | 0 | 0 |
| Cross-cut | 2–3 | 1–2 | 2–3 |
| Color change | 3 | 0 | 1 |
| Blisters | m4/g0–1 | 0 | 0 |
| Swelling | 2–3 | 0 | 0 |
| 5 cycles: | | | |
| Cross-hatch | 0 | 0 | 0 |
| Cross-cut | 3 | 1 | 1–2 |
| Color change | 5 | 1 | 2–3 |
| Blisters | m4/g0–1 | 0 | 0 |
| Swelling | 3 | 0 | 0 |
| Regeneration: | | | |
| Cross-cut | 2 | 1 | 2 |
| Remark | very slight swelling | satisfactory | satisfactory slightly dark |

What is claimed is:

1. A coating composition comprising at least three components, comprising
   (I) a hydroxyl-containing binder dispersed or dissolved in a medium comprising one or more organic solvents comprising
      A. at least one hydroxyl-containing polyacrylate resin, wherein the hydroxyl-containing polyacrylate resin consists of a reaction product of a (meth)acrylate containing polyether groups and at least one monomer selected from the group consisting of
         i) a (meth)acrylic ester that is free from acid groups and does not contain polyether groups,
         ii) an ethylenically unsaturated monomer that carries at least one hydroxyl group per molecule and is free from acid groups,
         iii) at least one vinyl ester of an alpha-branched monocarboxylic acid having from 5 to 18 carbon atoms per molecule,
         iv) a reaction product of a (meth)acrylic acid with a glycidyl ester of an alpha-branched monocarboxylic acid having 5 to 18 carbon atoms per molecule,
         v) an ethylenically unsaturated monomer that is free from acid groups, and
         vi) combinations thereof,
            wherein each monomer is copolymerizable with other monomers, and
      B. optionally, at least one hydroxyl-containing oligomeric or polymeric resin, (II) a crosslinking agent comprising
   A. at least one polyisocyanate dispersed or dissolved in one or more organic solvents, and
   B. optionally, at least one further crosslinking agent, and
(III) a component comprising
   A. water, and
   B. optionally, a second hydroxyl-containing binder comprising at least one of
      i) a second at least one hydroxyl-containing polyacrylate resin, and
      ii) a second at least one hydroxyl-containing oligomeric or polymeric resin dispersed or dissolved in one or more organic solvents,
wherein the at least one hydroxyl-containing polyacrylate resin and the second at least one hydroxyl containing polyacrylate resin each independently contain polyether sidegroups, endgroups, or sidegroups and endgroups and the polyether is represented by general formula I

$$Y\text{---}(\text{---}O\text{---}R\text{---})_n\text{---} \qquad (I)$$

in which the index and variables have the following meanings:
   n=3 to 100;
   R=$C_1$ to $C_6$ alkanediyl or $C_3$ to $C_6$ cyclo-alkanediyl;
   Y=hydrogen atom or $C_1$ to $C_4$ alkyl.

2. The coating composition as claimed in claim 1, wherein a total of the at least one hydroxyl-containing polyacrylate resin in component (I) or optionally the second at least one hydroxyl-containing polyacrylate resin in component (III) is present in an amount, based on the components, of from 20 to 90% by weight.

3. The coating composition of claim 1, wherein the at least one hydroxyl-containing polyacrylate resin and the second at least one hydroxyl-containing polyacrylate resin each independently has a number average molecular weight Mn of between 1,000 and 50,000 daltons and an OH number of from 40 to 300 mg KOH/g.

4. The coating composition of claim 1, wherein the at least one hydroxyl-containing polyacrylate resin and the second at least one hydroxyl-containing polyacrylate resin each independently as a 50% strength solution in ethoxyethyl propionate at 23° C., has a viscosity≦6.0 dPas.

5. The coating composition of claim 1, wherein the index and variables in the general formula I have the following meanings:
   n=3 to 100;
   R=methylene, ethylene, propylene, tetramethylene, pentamethylene, hexamethylene, cyclopropanediyl, cyclo-butanediyl, cyclopentanediyl, cyclohexane-diyl, cycloheptanediyl, or cyclooctanediyl;
   Y=hydrogen atom, methyl, ethyl, n-propyl or n-butyl.

6. The coating composition of claim 1, wherein the polyether groups have a number average molecular weight Mn of from 133 to 1,500 daltons.

7. The coating composition of claim 1, wherein the (meth)acrylate containing polyether groups is selected from the group consisting of polyethylene glycol monomethacrylates, polyethylene glycol monoacrylates, methoxypolyethylene glycol methacrylates, methoxypolyethylene glycol acrylates, and mixtures thereof in which the polyether groups have a number average molecular weight Mn of from 700 to 800 daltons.

8. The coating composition of claim 1, wherein i) component (I) comprises more than one hydroxyl-containing binder, ii) component (III) further comprises the second hydroxyl-containing binder, or iii) component (I) comprises more than one hydroxyl-containing binder and component (III) further comprises the second hydroxyl-containing binder.

9. The coating composition of claim 8, wherein the at least one hydroxyl-containing oligomeric or polymeric resin dispersed or dissolved in one or more organic solvents of components (I) and (III) are each independently selected from the group consisting of A1, A2, A3, and mixtures thereof, and optionally A4, wherein
   (A1) one or more acrylate copolymers, which are dispersed or dissolved in one or more organic solvents, and contain hydroxyl groups and acid groups that can be converted into the corresponding-acid anion groups, and have a number average molecular weight Mn of between 1,000 and 30,000 daltons, an OH number of from 40 to 200 mg KOH/g, and an acid number of from 5 to 150 mg KOH/g,
   (A2) one or more polyester resins, which are dispersed or dissolved in one or more organic solvents, and contain hydroxyl groups and acid groups that can be converted into the corresponding acid anion groups, and have a number average molecular weight Mn of between 1,000 and 30,000 daltons, an OH number of from 30 to 250 mg KOH/g, and an acid number of from 5 to 150 mg KOH/g,
   (A3) one or more polyurethane resins, which are dispersed or dissolved in one or more organic solvents, and contain hydroxyl groups and acid groups that can be converted into the corresponding acid anion groups, and have a number average molecular weight Mn of between 1,000 and 30,000 daltons, an OH number of from 20 to 200 mg KOH/g, and an acid number of from 5 to 150 mg KOH/g, and
   (A4) optionally, at least one further binder.

10. The coating composition of claim 8, wherein component (III) further comprises the second hydroxyl-containing binder, and the second hydroxyl-containing binder is in an aqueous dispersion.

11. The coating composition of claim 8, wherein component (III) further comprises the second hydroxyl-containing binder, and the second hydroxyl-containing binder is in a powder slurry form.

12. The coating composition of claim 1, wherein at least one of components (I), (II), and (III) further comprise the further crosslinking agent, which is at least one of an epoxide compound containing at least two epoxide groups per molecule, at least one amino resin, at least one blocked polyisocyanate, at least one tris(alkoxy-carbonylamino) triazine, at least one siloxane, and at least one beta-hydroxyalkylamide.

13. The coating composition of claim 1 applied as at least one of an automotive OEM finishing, a refinish, a coating for plastics, a topcoat material, and a primer-surfacer.

14. The coating composition of claim 1, wherein the medium consists of the one or more organic solvents.

* * * * *